(12) United States Patent
Ichiyama

(10) Patent No.: US 6,504,911 B1
(45) Date of Patent: Jan. 7, 2003

(54) TELEPHONE DEVICE

(75) Inventor: Yoshihito Ichiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/257,260

(22) Filed: Feb. 25, 1999

(30) Foreign Application Priority Data

Mar. 5, 1998 (JP) .......................................... 10-053702

(51) Int. Cl.[7] .......................... H04M 1/64; H04M 1/50; H04M 3/42
(52) U.S. Cl. ...................... 379/67.1; 379/76; 379/88.04; 379/88.16; 379/88.19; 379/88.21; 379/88.22; 379/68; 379/88.27; 379/201.02; 379/167.08
(58) Field of Search ........................... 379/67.1, 68, 76, 379/85, 88.01, 88.02, 88.03, 88.11, 88.17, 88.19, 88.04, 88.12, 88.16, 88.18, 88.2, 88.21, 88.22, 88.27, 88.28, 167.08, 201.02

(56) References Cited

U.S. PATENT DOCUMENTS

| | | | | |
|---|---|---|---|---|
| 5,007,076 A | * | 4/1991 | Blakely | 379/67 |
| 5,220,599 A | * | 6/1993 | Sasano et al. | 379/142 |
| 5,394,445 A | * | 2/1995 | Ball et al. | 379/67 |
| 5,481,594 A | * | 1/1996 | Shen et al. | 379/67 |
| 6,021,181 A | * | 2/2000 | Miner et al. | 379/88.23 |
| 6,028,921 A | * | 2/2000 | Malik et al. | 379/201 |
| 6,031,899 A | * | 2/2000 | Wu | 379/142 |
| 6,038,443 A | * | 3/2000 | Luneau | 455/415 |
| 6,178,230 B1 | * | 1/2001 | Borland | 379/67.1 |

* cited by examiner

*Primary Examiner*—Allan Hoosain
(74) *Attorney, Agent, or Firm*—Jay H. Maioli

(57) ABSTRACT

A telephone device that has a call subscriber telephone number detector, a memory for memorizing a plurality of call subscriber information audio signal in advance and which can memorize an arbitrary call subscriber telephone number in correspondence with a call subscriber information audio signal arbitrarily selected from the plurality of call subscriber information audio signals,

- a comparator for comparing whether a call subscriber telephone number detected by the call subscriber telephone number detector is coincident with a call subscriber telephone number memorized in the memory, upon coming-call, and
- an electroacoustic transducer to which a call subscriber information audio signal read out from the memory is supplied, wherein
- when it is detected by the comparator that a call subscriber telephone number detected by the call subscriber telephone number detector is coincident with a certain call subscriber telephone number memorized in the memory, a certain call subscriber information audio signal corresponding to the certain call subscriber telephone number is read out, and then supplied to the electroacoustic transducer.

4 Claims, 2 Drawing Sheets

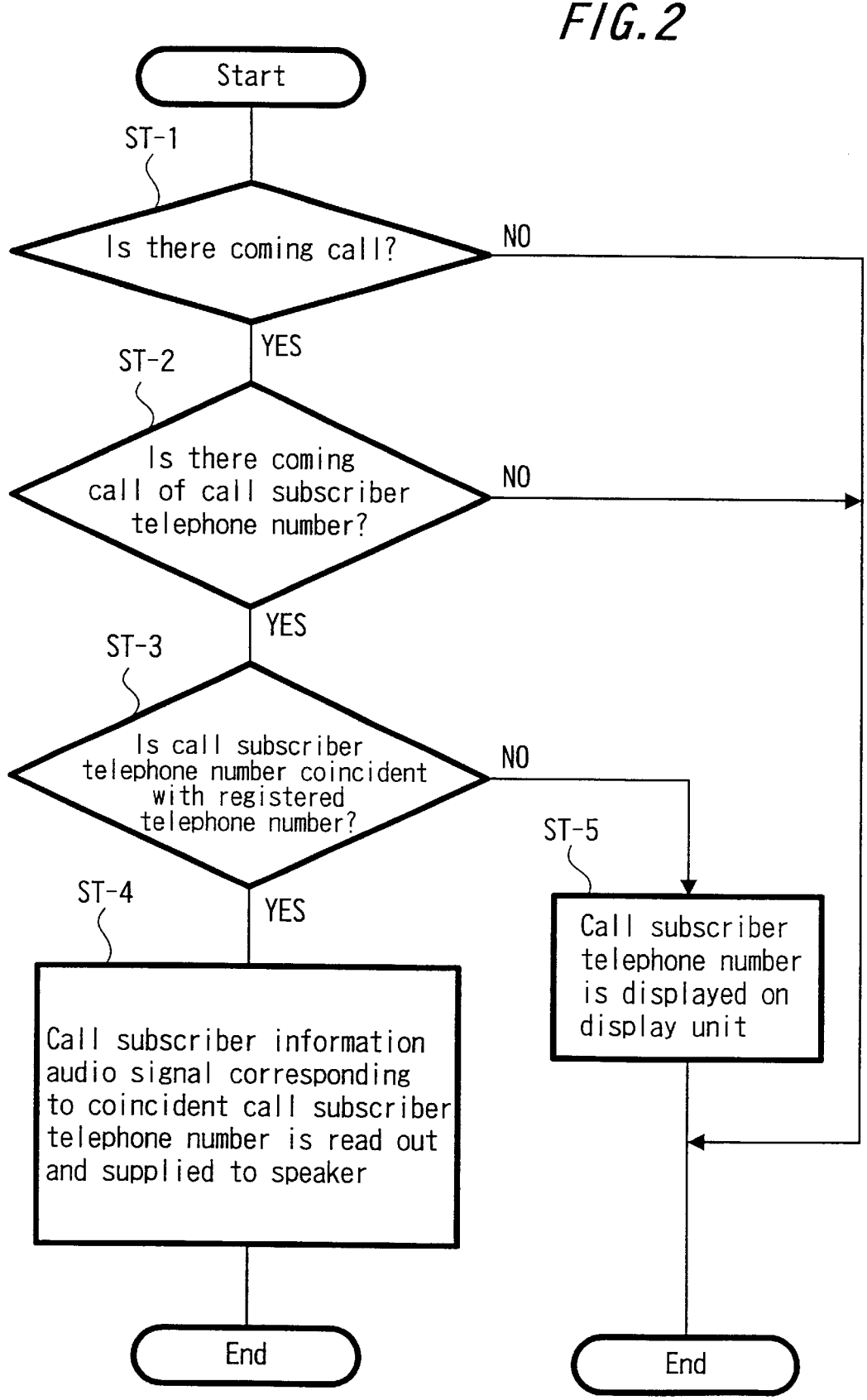

TELEPHONE DEVICE

BACKGROUND OF THE INVENTION

1. Field of the Invention

The present invention relates to a telephone device capable of detecting the telephone number of a call subscriber at a time of an arrival of an incoming call.

2. Description of the Related Art

In a conventional telephone device having a detector of a telephone number of a call subscriber for detecting a telephone number of the call subscriber, at a time of an arrival of an incoming call, such a telephone device is proposed in which a user makes a memorizing means memorize the telephone number of the call subscriber and an audio signal based on a recording by uttering the name of the call subscriber corresponding to the telephone number of the call subscriber toward an electroacoustic tranceducer device, and at the time of the arrival of the incoming call, when the telephone number of the call subscriber detected by the detector of the telephone number of the call subscriber coincides with the telephone number of the call subscriber memorized by the memorizing means, an audio signal of the call subscriber name correponding to the telephonenumber of the concident call subscriber is read out from the memorizing means and supplied to a speaker in order for the name to be sounded.

With the conventional telephone device, however, because the audio signal of the call subscriber name is complicated due to a recording by the user and at the same time, because of a noise around the place where the recording took place as well as not-so-good utterance sounds by the user, or because of a case where a voice's volume is not constant due to uttering in loud or low voices, it has been difficult to record an audio signal of a name having beautiful and harmonious sounds. Also, it takes much time to carry out a recording, which is very complicated.

SUMMARY OF THE INVENTION

In view of these points, the present invention is, in a telephone device for reading out a memorized call subscriber information audio signal and supplying the same to an convertor, when the telephone number of a call subscriber coinciding with the memorized call subscriber telephone number arrives at a time of the arrival of the incoming call, to propose a telephone device which causes a user fewer inconveniences in recording the call subscriber information audio signal and is capable of reading out a call subscriber information audio signal having beautiful and harmonious sounds and supplying the same to an electroacoustic transducer.

The present invention is a telephone device comprising a call subscriber telephone number detector; a memory means in which a plurality of call subscriber information audio signals are memorized beforehand and which is capable of memorizing an arbitrary call subscriber telephone number in correspondence to a call subscriber information audio signal arbitrarily selected from the plurality of call subscriber information audio signals; a comparison means for comparing whether or not the call subscriber telephone number detected by the call subscriber telephone number detector at a time of an arrival of an incoming call coincides with the call subscriber telephone number memorized by the memory means; and an electroacoustic transducer to which the call subscriber information audio signal read out from the memory means is supplied, wherein when it is detected by the comparison means that the call subscriber telephone number detected by the call subscriber telephone number detector coincides with the call subscriber telephone number memorized by the memory means, a certain call subscriber information audio signal corresponding to the call subscriber telephone number is read out and supplied to the electroacoustic transducer.

According to the present invention mentioned above, at a time of the arrival of the incoming call, when it is detected by the comparison means that the call subscriber telephone number detected by the call subscriber telephone number detector coincides with a certain call subscriber telephone number memorized by the memory means, the information audio signal concerning the call subscriber corresponding to the call subscriber telephone number memorized by the memory means is read out and supplied to the electroacoustic transducer.

BRIEF DESCRIPTION OF THE DRAWINGS

FIG. 2 is a flowchart presented for explaining an operation of the telephone device shown in FIG. 1

DESCRIPTION OF THE PREFERRED EMBODIMENTS

Figure 1:
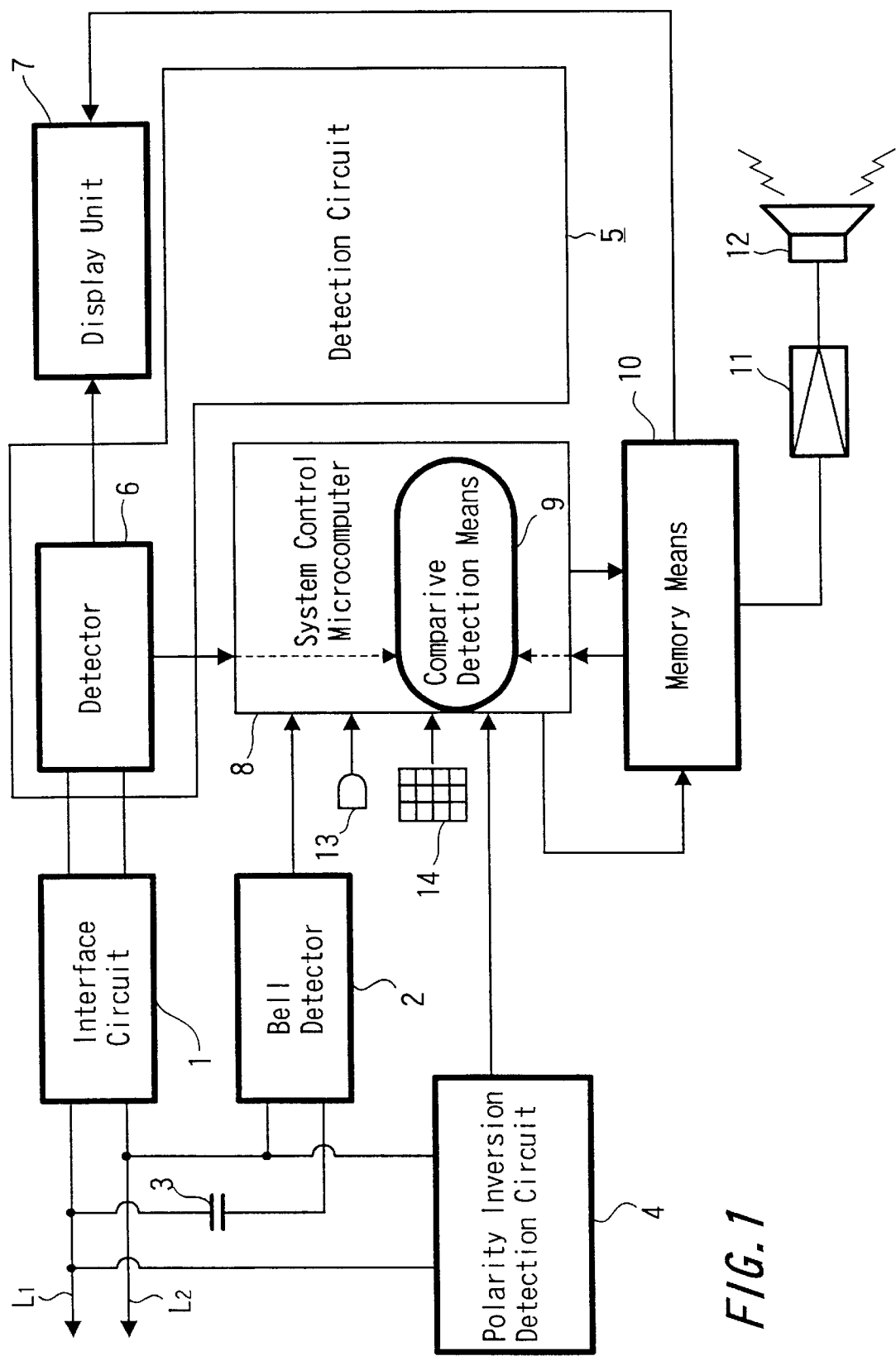
FIG. 1 is a block diagram showing a telephone device as an concrete example of the embodiment of the present invention.

The present invention is a telephone device comprising a call subscriber telephone number detector; a memory means in which a plurality of call subscriber information audio signals are memorized beforehand and which is capable of memorizing an arbitrary call subscriber telephone number in correspondence to a call subscriber information audio signal arbitrarily selected from the plurality of call subscriber information audio signals; a comparison means for comparing whether or not the call subscriber telephone number detected by the call subscriber telephone number detector coincides with the call subscriber telephone number memorized by the memory means; and an electroacoustic convertor to which the call subscriber information audio signals read out from the memory means is supplied, wherein when it is detected by the comparison means that the call subscriber telephone number detected by the call subscriber telephone number detector at a time of an arrival of the incoming call coincides with the call subscriber telephone number memorized by the memory means, a certain call subscriber information audio signal corresponding to the certain call subscriber telephone number is read out and supplied to the electroacoustic transducer.

In the telephone device of the present invention, a plurality of a call subscriber information audio signals are an audio signal synthesized by way of an audio synthesizing means.

In the telephone device of the present invention, a call subscriber information audio signal as an audio signal concerning a call subscriber is an audio signal of any one or a combination of a family name (last name), a first name, a name of a place where the call scriber's telephone number is registered, that is, names of municipalities (names of local areas such as a metropolis, a county, a prefecture, a city and the like in Japan), a name of a relative and a call subscriber telephone number.

Hereafter, a concrete example of a telephone device of an embodiment of the present invention, which is applied for use in Japan will be explained with reference to the drawings. First of all, an arrangement of the telephone device will be explained with reference to FIG. 1. Signal lines $L_1$ and $L_2$ connected to a telephone circuit are connected to a detection circuit 5 capable of being made up of a DSP (Digital Signal Processor) through a circuit interface 1. The detection circuit 5 is a circuit for carrying out the detection of a call subscriber telephone number, the detection of a DTMF (Dual Tone Multi-frequency) signal, the detection of a dial tone, the detection of an audible sound (detection of an audible signal) and the like. Meanwhile, a detector 6 for detecting the call subscriber telephone number is includeded in the detection circuit 5.

The call subscriber telephone number detector 6, upon detection of the call subscriber telephone number transmitted from a telephone exchanger, supplies the detected signal to a display unit 7 to display the call subscriber telephone number thereon. Also, the telephone number detected signal is supplied to a system control microcomputer 8. In this case, in a case where the call subscriber telephone number and a call subscriber name corresponding to it are memorized by a memory means 10 to be later mentioned, the call subscriber name, for example, a name in Japanese katakana writing is displayed on the display unit 7 singly or together with the call subscriber telephone number.

The signal lines $L_1$ and $L_2$ are directly connected to a polarity inversion detection circuit 4 and also to a bell detector 2 as well through a capacitor 3. At a time of an arrival of an incoming call, a bell sound signal is detected by the bell detector 2 and the detected signal is supplied to the microcomputer 8. Also, because the polarity of the DC voltage of the signal lines $L_1$ and $L_2$ is inverted at a time of the arrival of the incoming call, the polarity inversion is detected by the polarity inversion detection circuit 4. The detected signals of the bell detector 2 and the polarity inversion detection circuit 4 are supplied to the microcomputer 8.

Next, the memory means 10 of the call subscriber telephone number and the call subscriber information audio signal will be explained. The memory means 10 is divided into a call subscriber telephone number memory unit and a call subscriber information audio signal memory unit. Then, the call subscriber telephone number memory unit is made up of a rewritable non-volatile memory, for example, an EEPROM and the call subscriber information audio signal memory unit uses a non-volatile memory, for example, a FLASH ROM. This the FLASH ROM is made up of an unrewritable region and a rewritable region.

The call subscriber information audio signal by the audio synthesizing means is beforehand memorized in the unrewritable region of the call subscriber information audio signal memory unit of the memory means 10 by a maker. The write-in and read-out of the memory means 10 is controlled by the microcomputer 8. As examples of the call subscriber information audio signals, 80 to 100 pieces of audio signals such as family names (last names), of which there are many in Japan, of "Mr or Ms Sato", "Mr or Ms Suzuki", "Mr or Ms Tanaka" and the like are disposed and memorized in predetermined order, Japanese AIUEO order of 50 letters and alphabetical order. Also, about 10 pieces of relative names such as, for example, "grandfather", "grandmother", "father", "mother", "uncle", "aunt" and the like are memorized.

In Japan, the registration of 100 pieces of family names (last names), of which there are comparatively many, can cope with about 40 to 60 percent of the family names last names), but with respect to other family names (last names), respective family names for arbitrary telephone numbers are beforehand memorized in a rewritablel region of the call subscriber information audio signal memory unit by using an electric-audio conversion means 13.

Meanwhile, as an attached audio signal for these call subscriber information audio signals, a term to the effect "there is a call from Mr or Ms X" is memorized in an unrewritable region of the call subscriber information audio signal memory unit.

Then, under the control of the microcomputer 8, a desired audio signal is selected from a large number of call subscriber information audio signals memorized beforehand by the memory means 10 and then by relating the same to the call subscriber telephone number by using a dial button 14 and the like, the call subscriber telephone number is written in and registered on the memory means 10.

When there is an incoming call, it is detected by, for example, the polarity inversion detection circuit 4 and when the call subscriber telephone number is detected by the call subscriber telephone number detector 6, a lot of the call subscriber telephone numbers memorized in the memory means 10 are read out successively by a comparative detection means 9 of the system control microcomputer 8 and the coincidence detection of whether or not they coincide with the call subscriber telephone numbers detected by the call subscriber telephone number detector 6 is carried out.

Of the call subscriber telephone numbers read out from the memory means 10 by the comparative detection means 9, when there is a certain call subscriber telephone number which coincides with the call subscriber telephone number detected by the call subscriber telephone number detector 6, the certain call subscriber information audio signal corresponding to the certain call subscriber telephone number is read out by identifying data under the control of the microcomputer 8 and is supplied to a speaker 12 through a low frequency amplifier 11 and sounds of, for example, "There is a telephone call from Mr ○○" (here, ○○ denotes a family name) are emitted. At this time, if the call subscriber telephone number at the time of an incoming call is not registered in the memory means 10, only the call subscriber telephone number is displayed on the display unit 7.

Next, the operation of the concrete example of of the telephone device will be explained with reference to the flowchart in FIG. 2. At step ST-1, it is judged by the polarality inversion detection circuit 4 or the bell detector 2 whether or not there is an incoming call, and when the judgement is NO, the process is terminated, while the judgement is YES, the process proceeds to step ST-2.

At step ST-2, it is judged by the call subscriber telephone number detector 6 whether or not there is an incoming call of the call subscriber telephone number, and when the judgement is NO, the process is terminated while when the judgement is YES, the process proceeds to step ST-3.

At step ST-3, it is judged by the comparative detection means 9 of the microcomputer 8 whether or not the call subscriber telephone number detected by the call subscriber telephone number detector 6 coincides with the call subscriber telephone number memorized by the memory means 10, and when the judgement is NO, the process proceeds to step ST-5 while when the judgement is YES, the process proceeds to step ST-4.

At step ST-4, a certain call subscriber information audio signal corresponding to the coinciding call subscriber telephone number is read out from the memory means 10 and supplied to the speaker 12.

At step ST-5, the call subscriber telephone number signal from the call subscriber telephone number detector 6 which has no correspondence to the call subscriber telephone number and the call subscriber information audio signal is supplied to the display unit 7 and the call subscriber telephone number is displayed on the display unit 7.

Meanwhile, the present invention is not limited to the above-mentioned embodiment. For example, when the call subscriber telephone number is registered as well as memorized by the memory means 10, the call subscriber name, that is, family name as the call subscriber information audio signal, is sounded by the speaker 12. However, at the same time, the call subscriber telephone number can be displayed on the display unit 7 as well as the call subscriber family name can be displayed on the display unit 7.

Also, the call subscriber information audio signal may not be one which distinguishes the call subscriber, and that is, it may denote a name of the place where the telephone number of the telephone device of the call subscriber is registered.

Also, a distinguishing rate becomes higher by sounding both of the name of the place where the telephone number is registered and the call subscriber name.

Further, when the correpondence of the call subscriber information audio signal to the call subscriber telephone number is not registered, the telephone number of the call subscriber may be sounded by way of the audio synthesizing means.

According to the present invention, there are provided a call subscriber telephone number detector, a memory means in which a plurality of call subscriber information audio signals are memorized beforehand and which is capable of memorizing an arbitrary call subscriber telephone number in correspondence to a call subscriber information audio signal arbitrarily selected from the plurality of call subscriber information audio signals, a comparison means for comparing whether or not the call subscriber telephone number detected by the call subscriber telephone number detector at a time of an arrival of an incoming call coincides with the call subscriber telephone number memorized by the memory means, and an electroacoustic transducer to which the call subscriber information audio signal read out from the memory means is supplied, wherein when it is detected by the comparison means that the call subscriber telephone number detected by the call subscriber telephone number detector coincides with the call subscriber telephone number memorized by the memory means, a certain call subscriber information audio signal corresponding to the certain call subscriber telephone number is read out and supplied to the electroacoustic transducer, and hence, the user doesn't have to resort to any inconvenience of recording the call subscriber information audio signal or the user has only to carry out a small amount of recording, thereby making it possible to obtain the telephone device capable of reading out a beautiful and harmonious call subscriber audio signal as well as supplying it to the electroacoustic transducer.

In the telephone device according to the present invention, a plurality of the call subscriber information audio signals an audio signal synthesized by way of the audio synthesizing means.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A telephone device, comprising:

an incoming caller telephone number detector for detecting a telephone number of an incoming call to a user of the device;

memory means having a call subscriber telephone number unit made up of a rewritable memory for memorizing a plurality of telephone numbers and a call subscriber information audio unit made up of a nonvolatile memory having an unrewritable region and a rewritable region, wherein the unrewritable region is prerecorded to contain a plurality of commonly occurring surnames and said subscriber telephone number unit contains a plurality of telephone numbers corresponding respectively to ones of said plurality of commonly occurring surnames selected by the user;

microphone means for use by the user to enter information audio signals of names of incoming callers into the rewritable region of the nonvolatile memory of the call subscriber information audio unit, wherein said;

an electroacoustic transducer to which an incoming caller information audio signal read out from the memory means is supplied; and comparing means for comparing whether an incoming caller telephone number detected by the incoming caller telephone number detector is coincident with one of the plurality of telephone numbers memorized in the memory means upon an incoming call, wherein when coincidence is found coincident data is output therefrom and fed to the memory means so that the incoming caller information audio signal corresponding to the telephone number of the incoming call is read out from the memory means by the coincident data from the comparing means and fed to the electroacoustic transducer and the name of the incoming caller is reproduced as audible sounds.

2. The telephone device as claimed in claim 1, wherein the incoming caller information audio signal causes the electroacoustic transducer to announce a name of a relative of the user.

3. The telephone device as claimed in claim 1, wherein the incoming caller information audio signal causes the electroacoustic transducer to also announce a place name where a telephone number of the incoming call is registered.

4. The telephone device as claimed in claim 1, wherein when the coincident data is not obtained from the comparing means the telephone number of the call subscriber is sounded from the electroacoustic transducer and/or displayed on a display device.

* * * * *